(12) United States Patent
Hamamoto et al.

(10) Patent No.: US 9,618,794 B2
(45) Date of Patent: Apr. 11, 2017

(54) LIQUID CRYSTAL DISPLAY APPARATUS

(71) Applicant: STANLEY ELECTRIC CO., LTD., Meguro-ku, Tokyo (JP)

(72) Inventors: Manabu Hamamoto, Yamato (JP); Yoshihisa Iwamoto, Yokohama (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 45 days.

(21) Appl. No.: 14/686,385

(22) Filed: Apr. 14, 2015

(65) Prior Publication Data

US 2015/0338694 A1 Nov. 26, 2015

(30) Foreign Application Priority Data

May 22, 2014 (JP) ................................. 2014-105776

(51) Int. Cl.

| | | |
|---|---|---|
| *G02F 1/13363* | (2006.01) | |
| *G02F 1/1337* | (2006.01) | |
| *G02F 1/1335* | (2006.01) | |
| *C09K 19/02* | (2006.01) | |

(52) U.S. Cl.

CPC ...... *G02F 1/13363* (2013.01); *C09K 19/0208* (2013.01); *G02F 1/1337* (2013.01); *G02F 1/133528* (2013.01); *G02F 1/133615* (2013.01); *G02F 1/133621* (2013.01); *G02F 2001/133531* (2013.01); *G02F 2001/133738* (2013.01); *G02F 2202/40* (2013.01); *G02F 2413/08* (2013.01); *G02F 2413/13* (2013.01)

(58) Field of Classification Search

CPC . G02F 2203/64; G02F 2203/66; G02F 1/1396
See application file for complete search history.

(56) References Cited

U.S. PATENT DOCUMENTS

| | | | | |
|---|---|---|---|---|
| 5,091,794 A | * | 2/1992 | Suzuki | ................. G02F 1/1396 349/181 |
| 5,448,386 A | | 9/1995 | Watanabe et al. | |
| 6,600,545 B1 | | 7/2003 | Sugiyama et al. | |
| 2004/0252258 A1 | * | 12/2004 | Matsushima | ......... G02F 1/1323 349/96 |
| 2009/0066621 A1 | * | 3/2009 | Iwamoto | ............. G09G 3/3406 345/88 |
| 2010/0188627 A1 | * | 7/2010 | Jeon | .................... G02F 1/13363 349/119 |

(Continued)

FOREIGN PATENT DOCUMENTS

| | | |
|---|---|---|
| JP | 01216318 A | 8/1989 |
| JP | 02125224 A | 5/1990 |
| JP | 2001147414 A | 5/2001 |

*Primary Examiner* — Paisley L Arendt
*Assistant Examiner* — Edmond Lau
(74) *Attorney, Agent, or Firm* — Holtz, Holtz & Volek PC (57) ABSTRACT

There is provided a liquid crystal display apparatus in which a retardation Δnd of a liquid crystal layer is greater than 2 μm. Absorbing axes of the first polarizer and the second polarizer are in parallel to an alignment direction of the liquid crystal molecules on surfaces of the first substrate or the second substrate. A slow axis of the optical film and the absorbing axes of the first polarizer and the second polarizer are in parallel to each other or orthogonal to each other. An in-plane retardation of the optical film is from 300 nm to 430 nm.

8 Claims, 6 Drawing Sheets

(56) References Cited

U.S. PATENT DOCUMENTS

| | | | |
|---|---|---|---|
| 2011/0157515 A1* | 6/2011 | Li | G02B 5/0242 349/62 |
| 2012/0026421 A1* | 2/2012 | Park | C09K 19/02 349/43 |
| 2012/0218174 A1* | 8/2012 | Kim | G09G 3/3413 345/88 |

* cited by examiner

LIQUID CRYSTAL DISPLAY APPARATUS

CROSS-REFERENCE TO RELATED APPLICATION

This application is based upon and claims the benefit of priority of the prior Japanese Patent Applications No. JP 2014-105776, filed on May 22, 2014, the entire contents of which are incorporated herein by reference.

BACKGROUND OF THE INVENTION

A) Field of the Invention

The present invention relates to a liquid crystal display apparatus.

B) Description of the Related Art

In a liquid crystal display apparatus in which (i) a TN liquid crystal cell in which liquid crystal molecules are horizontally aligned with respect to substrates and the alignment direction of the liquid crystal molecules is twisted by 90° between the upper and lower substrates, (ii) is disposed between two polarizers disposed in the manner of an approximately parallel Nicol arrangement so that an alignment direction of the liquid crystal molecules on a surface of one substrate may be in parallel to or orthogonal to an absorbing axis of the polarizers, a transmitted light intensity T is represented as the following relational expression (1).

$$T = \frac{1}{2} \cdot \frac{\sin^2\left(\frac{\pi\sqrt{1+u^2}}{2}\right)}{1+u^2} \quad (1)$$

Herein, u is a value represented as following relational expression (2).

$$u = \frac{2\Delta nd}{\lambda} \quad (2)$$

In the relational expression (2), $\Delta n$ indicates a refractive index anisotropy of a liquid crystal material (a birefringence), d indicates a distance between an upper substrate and a lower substrate (a thickness of a cell), and $\lambda$ indicates a wavelength of the light to be incident on a liquid crystal display apparatus.

Figure 5:
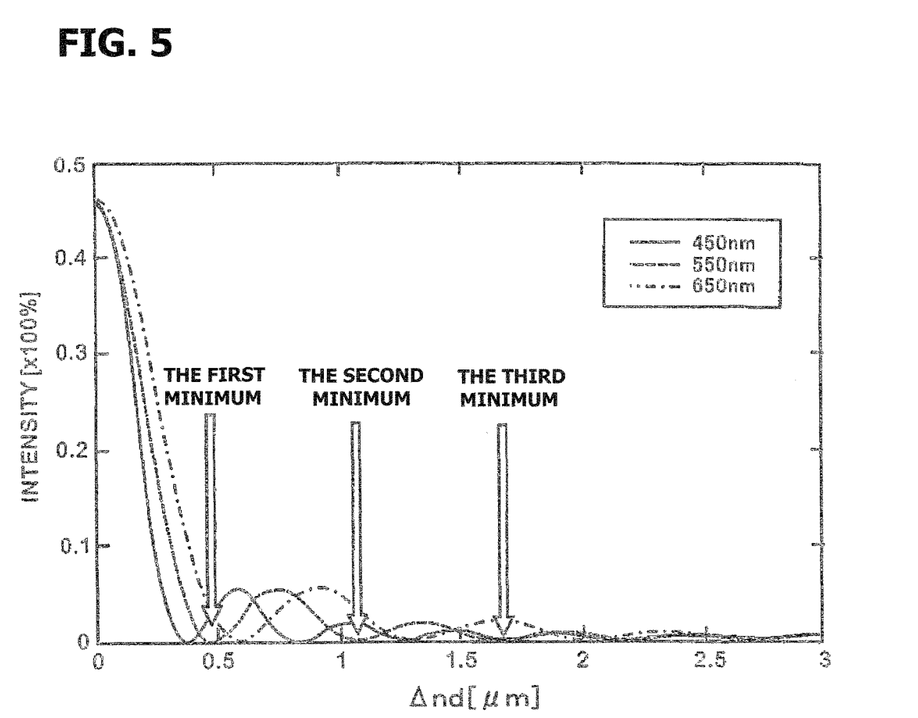
FIG. 5 is a graph showing the transmitted light intensities T of the relational expression (1) at λ=450 nm, 550 nm and 650 nm, respectively.

FIG. 5 is a graph showing the transmitted light intensities T of the relational expression (1) at $\lambda$=450 nm, 550 nm and 650 nm, respectively. The horizontal axis in the graph indicates $\Delta nd$ in a unit "μm", and the vertical axis indicates the transmitted light intensity T.

It can be seen to obtain a minimum value at which the transmitted light intensity T becomes zero (the first minimum obtained in the lowest $\Delta nd$, and after this, the second minimum and the third minimum are obtained as $\Delta nd$ increases). Also it can be seen that the value of $\Delta nd$ for giving the minimum value varies according to the wavelength $\lambda$ of the incident light.

For this reason, in the normally-black TN liquid crystal display apparatus, it is considered that it is difficult to obtain an excellent darkness state of the achromatic color. Further, in the normally-white TN liquid crystal display apparatus of the related art, $\Delta nd$ is generally set to the first minimum.

In the 90°-twisted TN liquid crystal cell, in a case where the retardation $\Delta nd$ of the liquid crystal layer is very greater than the wavelength $\lambda$ of the incident light ($\Delta nd \gg \lambda$), linearly polarized light which is incident from a surface of one substrate of the liquid crystal cell is not changed in state of the polarized light over all of the wavelengths thereof within the liquid crystal layers and optically rotates by 90° to thus be emitted as linearly polarized light from a surface of the other substrate. This condition is referred to as the Mauguin condition. However, if $\Delta nd$ does not increase significantly, it is difficult to obtain ideal characteristics, and thus this condition is not practical.

Herein, there have been proposed two types of configuration for the liquid crystal display elements of which typical examples are Japanese Unexamined Patent Application Publication No. 1-216318 and Japanese Unexamined Patent Application Publication No. 2001-147414, respectively.

Japanese Unexamined Patent Application Publication No. 1-216318 describes an invention for a normally-black TN liquid crystal display element in which much of fine unevenness is provided on the internal surface of at least one substrate, and the retardation $\Delta nd$ of the liquid crystal layer is set to 1.4 μm to 2.2 μm, and the twisted angle is set to 60° to 150° respectively so as to improve the contrast and realize a background having a little coloration. Since the value of $\Delta nd$ for giving the minimum value of a transmittance varies according to the wavelength $\lambda$ of the incident light as described with reference to FIG. 5, cell areas having different thicknesses are distributed in the liquid crystal layers to realize the average background thereof and thereby, a processing for achromatic color of the background is performed.

Japanese Unexamined Patent Application Publication No. 2001-147414 discloses an invention for a TN liquid crystal display element in which the unevenness is not provided on the substrate surface, and the retardation And of a liquid crystal layer is set to greater than 2 μm. In this case, it is possible to realize a negative display in which a background transmittance is relatively low and the contrast is high.

As described in Japanese Unexamined Patent Application Publication No. 2001-147414, recently, a negative (normally-black) liquid crystal display element having a simpler configuration is widely used.

There has been proposed a method for improving viewing angle characteristics in the TN liquid crystal display element for the negative display (for example, Japanese Unexamined Patent Application Publication No. 2-125224). Japanese Unexamined Patent Application Publication No. 2-125224 describes a technique in which a pair of phase difference (retardation) plates are disposed between parallel Nicol polarizers disposed on the front and rear portions of, for example, a 90°-twisted TN liquid crystal cell interposed between the polarizers so as to arrange a slow axis of the phase difference plate in parallel to a transmittance axis of the polarizer adjacent to the phase difference plate, and thus it is possible to improve the viewing angle characteristics. In an embodiment of Japanese Unexamined Patent Application Publication No. 2-125224, a 90°-twisted TN liquid crystal cell is used in which the retardation And of the liquid crystal layer is 470 nm. However, a distribution of the refractive index in the used phase difference plates or a range for in-plane phase difference values is not described.

SUMMARY OF THE INVENTION

A liquid crystal display apparatus may be configured using the TN liquid crystal display elements for the negative display which is configured as described in Japanese Unexamined Patent Application Publication No. 1-216318 and Japanese Unexamined Patent Application Publication No.

2001-147414. For example, a backlight unit is provided on the rear surface of one polarizer. The backlight unit includes a white light source as an example and illuminates at least an effective display area of the liquid crystal display element. Further, the liquid crystal display element is connected to a drive device for electrically switching between the brightness and darkness of the display portion, and also is connected to a control device for controlling the drive device to display desired images.

In such a liquid crystal display apparatus, when a displayed portion is viewed at an angle inclined by 40° or more in the right and left directions from a normal direction of the liquid crystal display element (a display surface), particularly, a luminance during a brightness display becomes darkened significantly. Further, when viewing angle is further deeper, a blackout occurs and thus there may be a case where the displayed portions cannot be viewed.

As such a phenomenon, a difference may be generated due to colors of a light source of the backlight unit. For example, in order to artificially realize a brightness display color identical to that of a fluorescent display tube, in a case where a backlight unit having a blue light source is used or in a case where a blue color filter is disposed on the light emitting surface of the backlight unit having a white light source, a transmittance of the brightness display decreases significantly and thus a display quality in the liquid crystal display apparatus becomes unsatisfied.

Such a phenomenon does not occur in the condition of the first minimum and the second minimum in which the retardation $\Delta$nd of the liquid crystal layer is approximately 0.5 μm to 1.2 μm.

Figure 6A:
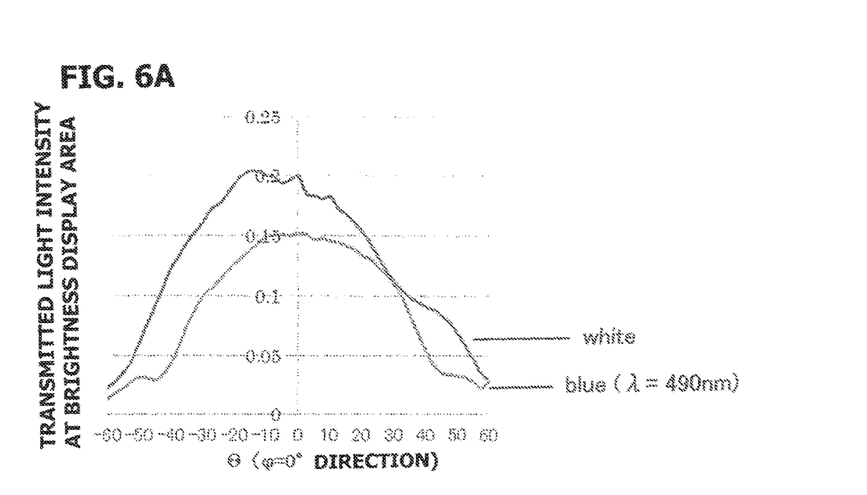
FIG. 6A and FIG. 6B are graphs showing transmittance characteristics in the liquid crystal display apparatus which is configured using the liquid crystal display elements described in Japanese Unexamined Patent Application Publication No. 2001-147414.
Figure 6B:
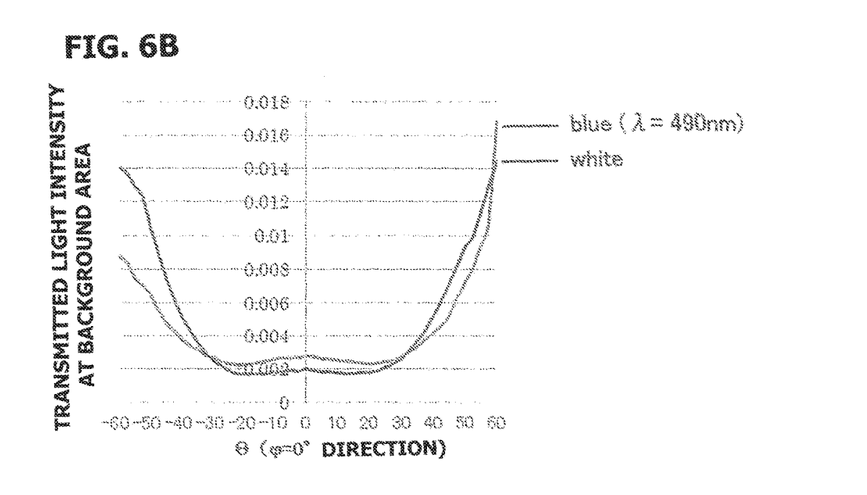

FIG. 6A and FIG. 6B are graphs showing transmittance characteristics in the liquid crystal display apparatus which is configured using the liquid crystal display elements (a TN liquid crystal display element in which the unevenness is not provided on the substrate surface, and the retardation $\Delta$nd of the liquid crystal layer is greater than 2 μm) described in, for example, Japanese Unexamined Patent Application Publication No. 2001-147414.

Specifically, a 90°-left-twisted liquid crystal cell in which the retardation $\Delta$nd of the liquid crystal layer is set to 2.76 μm ($\Delta$n=0.23, and a thickness of the liquid crystal layer, 12 μm), and the optimum viewing direction is a twelve o'clock direction, is disposed between parallel Nicol polarizers. A rubbing direction of the lower side (the rear side) substrate of the liquid crystal cell is approximately in parallel to the absorbing axis of the polarizer. The backlight unit is provided on the rear surface of the lower polarizer. Herein, a white backlight unit which includes an LED light source for emitting white light or a blue backlight unit which includes an LED light source for emitting blue light having a center wavelength (peak wavelength) of 490 nm is used. In the case of driving the liquid crystal display element, a drive device that performs a multiplex driving with ¼ duty and ⅓ bias is used and drive voltages 5 V and 0 V are applied.

The graphs in FIG. 6A and FIG. 6B show a transmitted light intensity for the brightness display and a transmitted light intensity for the background at an direction of nine o'clock to three o'clock, respectively. Each horizontal axis of the graphs indicates viewing angles in a unit of "∘" when the normal direction of the liquid crystal display element (a display surface) is assumed to be 0°. The case where the viewing angle inclines in the direction of nine o'clock is expressed as minus and the case where the viewing angle inclines in the direction of three o'clock is expressed as plus. Each vertical axis of the graphs indicates the transmitted light intensity when the light emitting intensity of the backlight unit is assumed to be "1". Both graphs indicate transmitted light intensity characteristics in a case where a backlight unit having a white light source is used, and transmitted light intensity characteristics in a case where a backlight unit having a blue light source is used.

With reference to FIG. 6A, in a case where the backlight unit having the blue light source is used, a transmitted light intensity for the brightness display is approximately ¾ when seen in a plan view, compared with a case where the backlight unit having the white light source is used. Further, the transmitted light intensity for the brightness display in a case where the viewing angle is in a range between ±45° and ±50° is approximately equal to or less than a half. As described above, in a case where the backlight unit having the blue light source is used, it can be seen that the brightness display transmittance decreases significantly (an ability for viewing a displayed portion decreases significantly).

With reference to FIG. 6B, also even in the case of the transmitted light intensity for the background, it can be seen that there is a difference between the blue light source and the white light source. However, a phenomenon can be seen in which, regardless of the light emitting colors of the backlight unit, in a range of ±30° or more, the deeper the viewing angle becomes, the more the quantity of the light leakage increases. Therefore, it is understood that this phenomenon causes the display quality to be degraded.

The inventor of this application carefully studied the TN liquid crystal display apparatus in which the retardation $\Delta$nd of the liquid crystal layer is greater than 2 μm.

Accordingly, it is an object of the present invention to provide a liquid crystal display apparatus that performs the excellent displaying.

According to one aspect of the present invention, there is provided a liquid crystal display apparatus including: a first substrate which includes a first electrode; a second substrate which is disposed opposite to and approximately parallel to the first substrate and includes a second electrode; a twisted nematic liquid crystal layer which is disposed between the first substrate and the second substrate, and is formed of a liquid crystal material of which a dielectric anisotropy is positive, and in which liquid crystal molecules are approximately horizontally aligned on the first substrate and the second substrate, and an alignment state of the liquid crystal molecules is twisted by approximately 90° between the first substrate and the second substrate; a first polarizer which is disposed on one side of the first substrate, opposite to the other side of the first substrate facing the liquid crystal layer; a second polarizer which is disposed on one side of the second substrate, opposite to the other side of the second substrate facing the liquid crystal layer, and is disposed in the manner of an approximately parallel Nicol arrangement with respect to the first polarizer; and an optical film which is disposed between the first substrate and the first polarizer, and has a positive uniaxial optical anisotropy. A display portion is defined on an overlapping position between the first electrode and the second electrode when seen in a normal direction of the first substrate and the second substrate, and the display portion includes at least a segment display portion, wherein a retardation $\Delta$nd of the liquid crystal layer is greater than 2 μm. Absorbing axes of the first polarizer and the second polarizer are in parallel to an alignment direction of the liquid crystal molecules on surfaces of the first substrate or the second substrate. A slow axis of the optical film is in parallel to or orthogonal to the absorbing axes of the first polarizer and the second polarizer. An in-plane retardation of the optical film is from 300 nm to 430 nm, and when seen from viewing angles of 40° to 50° of two directions which are orthogonal to an alignment direction of the liquid crystal molecules located at the center in the thickness direction of the liquid crystal layer, a transmitted light intensity in a non-display portion and a display portion in which voltage is not applied between the first electrode and the second electrode is lower than that of a case where the optical film is not disposed.

According to the present invention, it is possible to provide the liquid crystal display apparatus that performs the excellent displaying.

DESCRIPTION OF EMBODIMENTS

Figure 1A:
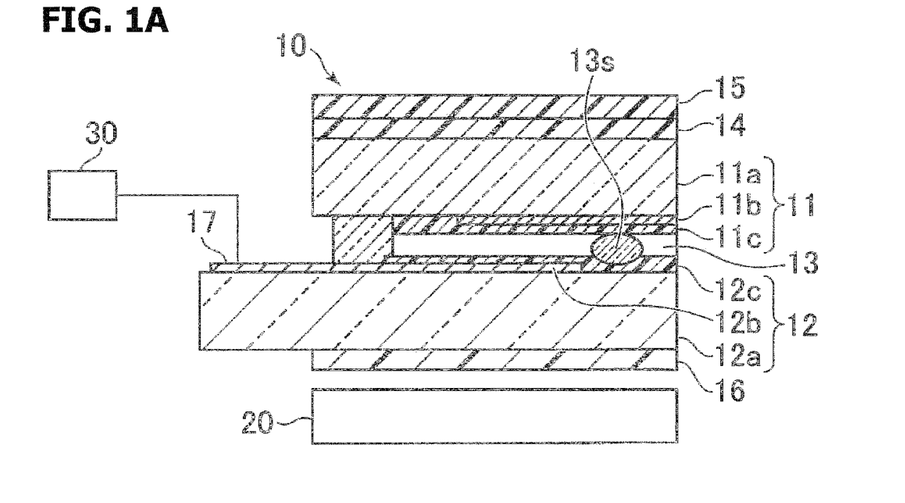
FIG. 1A is a schematic sectional view showing a configuration of a liquid crystal display apparatus according to one embodiment.

FIG. 1A is a schematic sectional view showing a configuration of a liquid crystal display apparatus according to one embodiment. The liquid crystal display apparatus according to the embodiment is configured to include a liquid crystal display element 10, a backlight unit 20 and a drive device 30.

The liquid crystal display element 10 is configured to include a front side substrate 11 and a rear side substrate 12 which face each other and are spaced approximately in parallel to each other, and a liquid crystal layer 13 which is disposed between the two substrates 11 and 12.

The front side substrate 11 includes a front side transparent substrate 11a, a front side transparent electrode 11b formed on the front side transparent substrate 11a, and a front side alignment film 11c formed on the front side transparent electrode 11b. Similarly, the rear side substrate 12 includes a rear side transparent substrate 12a, a rear side transparent electrode 12b formed on the rear side transparent substrate 12a, and a rear side alignment film 12c formed on the rear side transparent electrode 12b. The transparent substrates 11a and 12a are formed of, for example, glass. The transparent electrodes 11b and 12b are formed of transparent conductive materials such as ITO. The front side transparent electrode 11b and the rear side transparent electrode 12b are configured to define a display portion on the overlapping position with each other when seen in a plan view (when seen in a normal direction of the substrates 11 and 12). The display portion of the liquid crystal display element 10 includes at least a segment display portion that displays desired characters or patterns. The display portion may include not only the segment display portion but also a dot-matrix display portion.

The front side alignment film 11c and the rear side alignment film 12c are subjected to an alignment treatment using the rubbing process. The angle between the directions (rubbing directions) of the alignment treatment for the alignment films 11c and 12c is 90°.

The liquid crystal layer 13 corresponds to a twisted nematic (TN) liquid crystal layer which is disposed between the alignment film 11c of the front side substrate 11 and the alignment film 12c of the rear side substrate 12. The liquid crystal molecules in the liquid crystal layer 13 are approximately horizontally aligned on the surfaces of the substrates 11 and 12, and an alignment state of the liquid crystal molecules is twisted by approximately 90° extending in a direction from one substrate 12 to the other substrate 11. The liquid crystal layer 13 is configured using a nematic liquid crystal material of which a dielectric anisotropy is positive. The pretilt angle is set to 1.5°. The refractive anisotropy Δn of the liquid crystal material is, for example, 0.23. A chiral agent is added to the liquid crystal material for constituting the liquid crystal layer 13. An added amount thereof is adjusted so that d/p may be set to be 0.1 when a chiral pitch is p and the thickness of the liquid crystal layer 13 (the thickness of the cell) is d. The thickness d of the liquid crystal layer 13 is set to 12 μm. The retardation Δnd of the liquid crystal layer 13 is set to greater than 2 μm, and set to 2.76 μm in the case of the embodiment.

Further, the liquid crystal layer 13 is disposed in an area surrounded by a frame-like sealing unit. The sealing unit has a function of sealing for liquid crystal materials and also a function of bonding the substrates 11 and 12. In order to constantly maintain a distance between the substrates 11 and 12, a plastic spacer 13s is disposed in a dispersion manner within the plane and a glass spacer 13s is also disposed in a dispersion manner within the sealing unit.

A front side polarizer 15 and a rear side polarizer 16 are respectively disposed on one side of each of the front side substrate 11 and the rear side substrate 12, and the one side is opposite to the other side of the front side substrate 11 and the rear side substrate 12 which faces the liquid crystal layer 13. For example, a polarizer SHC 13U made by Polatechno Co., Ltd. may be used as the polarizers 15 and 16.

An optical film 14 is disposed between the front side substrate 11 and the front side polarizer 15 or may be disposed between the rear side substrate 12 and the rear side polarizer 16. The optical film 14 corresponds to a so called A plate having a slow axis in the film plane and also having a positive uniaxial optical anisotropy.

Figure 1B:
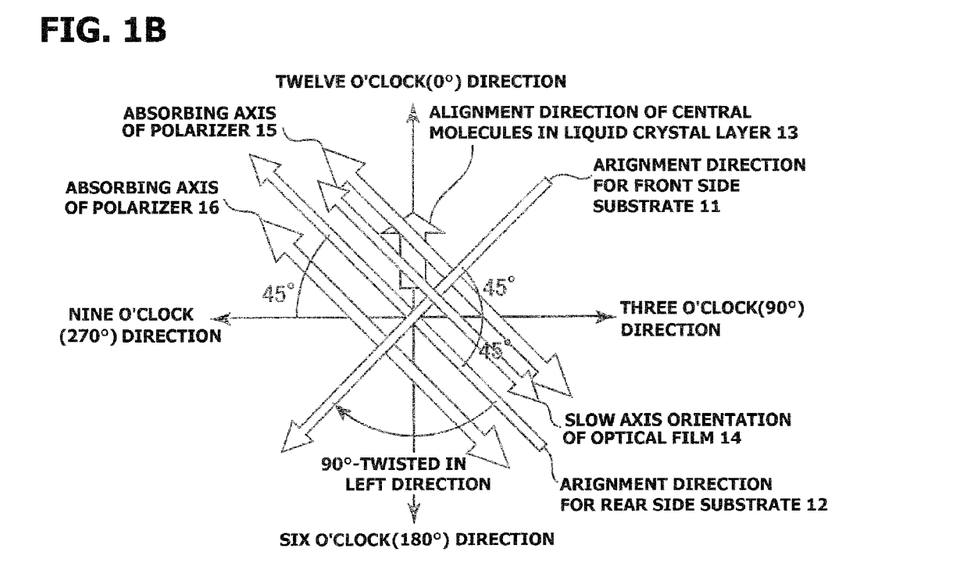
FIG. 1B is a schematic plan view showing alignment directions of substrates 11 and 12, absorbing axes of polarizers 15 and 16, and a slow axis of an optical film 14.

FIG. 1B shows alignment directions of substrates 11 and 12, absorbing axes of the polarizers 15 and 16, and a slow axis of the optical film 14. The upper and lower directions of the liquid crystal display apparatus (the display surface) are defined as direction of twelve o'clock (0°) and direction of six o'clock (180°), and the left and right directions thereof are defined as direction of nine o'clock (270°) and direction of three o'clock (90°), respectively.

The alignment direction of the front side substrate 11 is 225°, and the alignment direction of the rear side substrate 12 is 315°. The liquid crystal layer 13 corresponds to a 90°-twisted TN liquid crystal layer in the left direction, and the alignment direction of the central molecules in the liquid crystal layer 13 (the liquid crystal molecules located at the center in the thickness direction of the liquid crystal layer 13) is 0° (twelve o'clock) which corresponds to the optimum viewing direction.

The front side polarizer 15 and the rear side polarizer 16 are disposed in the manner of an approximately parallel Nicol arrangement so that the absorbing axis is 135° to 315°. The angle between the absorbing axes of the polarizers 15 and 16 and the alignment direction of the central molecules in the liquid crystal layer 13 is approximately 45°.

The slow axis of the optical film 14 is 135° to 315°. In other words, the optical film 14 is disposed such that the slow axis of the optical film 14 is approximately in parallel to the absorbing axes of the polarizers 15 and 16. Further, the optical film 14 may be disposed such that the slow axis of the optical film 14 is approximately orthogonal to the absorbing axes of the polarizers 15 and 16, in other words, the slow axis of the optical film 14 becomes 45° to 225°.

The liquid crystal display apparatus according to one embodiment is a normally-black TN liquid crystal display apparatus that realizes the darkness display when no voltage is applied.

With reference to FIG. 1A, a backlight unit 20 which emits blue light as an example during turning-on is disposed on, for example, the rear surface of the liquid crystal display element 10, and illuminates at least an effective display area of the liquid crystal display element 10. The backlight unit 20 is configured to include, for example, a lamp house, a light source, a drive device for turning on the light source, and a diffusion plate. The diffusion plate is disposed on a light emission surface of the backlight unit 20 and the like. A luminance enhancing film may be disposed upwardly on the diffusion plate, if necessary.

The backlight unit 20 which emits blue light during turning-on includes, for example, a blue LED (a light emitting source) having a center wavelength 490 nm as a light source. Alternatively, the backlight unit 20 may include a white light emitting source and a blue color filter of a center wavelength 490 nm to emit the blue light of the center wavelength 490 nm. The color filter is printed on the entire surface or a part of the diffusion plate. Further, there may be provided a configuration in which the backlight unit 20 which emits white light is used and a blue color filter is printed on the entire surface or a part of the rear surface of the rear side polarizer 16 in the liquid crystal display element 10. Also in this case, it may be considered that the backlight unit 20 for emitting the white light is combined with the blue color filter printed on the entire surface or a part of the rear surface of the polarizer 16 and the backlight unit (a light source) emits the blue light.

The electrodes 11b and 12b of the liquid crystal display element 10 are electrically connected to the electrode 17 which is led out to the outside through conductive particles and the like existing in the sealing unit. The drive device 30 is electrically connected to the led-out electrode 17 to drive the liquid crystal display element 10. The drive device 30 operates the liquid crystal display element 10 with, for example, a multiplex driving. A drive waveform output from the drive device 30 causes a voltage to be applied between both of the electrodes 11b and 12b so that brightness and darkness display are performed on the display portion.

The inventor of this application performed experiments on the liquid crystal display apparatuses having the configurations of FIG. 1A and FIG. 1B, and studied to find conditions for enabling realizing an excellent display based on various trials for changing in-plane retardation in the optical film 14. The data for the transmitted light intensity shown in FIG. 2A to FIG. 4B is obtained by measurements which are performed using multiplex driving (the drive voltage is 5 V) with ¼ duty, ⅓ bias and a frame frequency 60 Hz. For the measurements, EZ-LITE made by ELDIM was used.

Figure 2A:
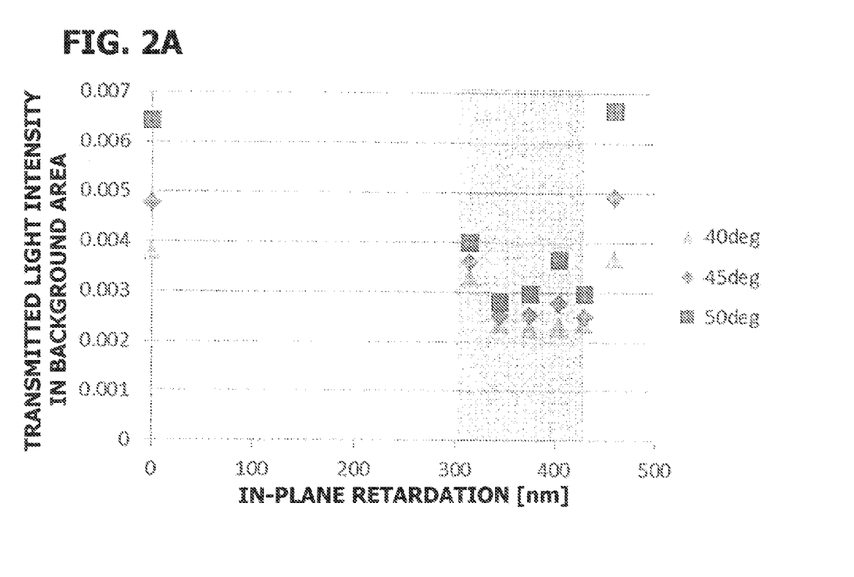
FIG. 2A and FIG. 2B are graphs showing an in-plane retardation dependency of a transmitted light intensity in a background area.
Figure 2B:
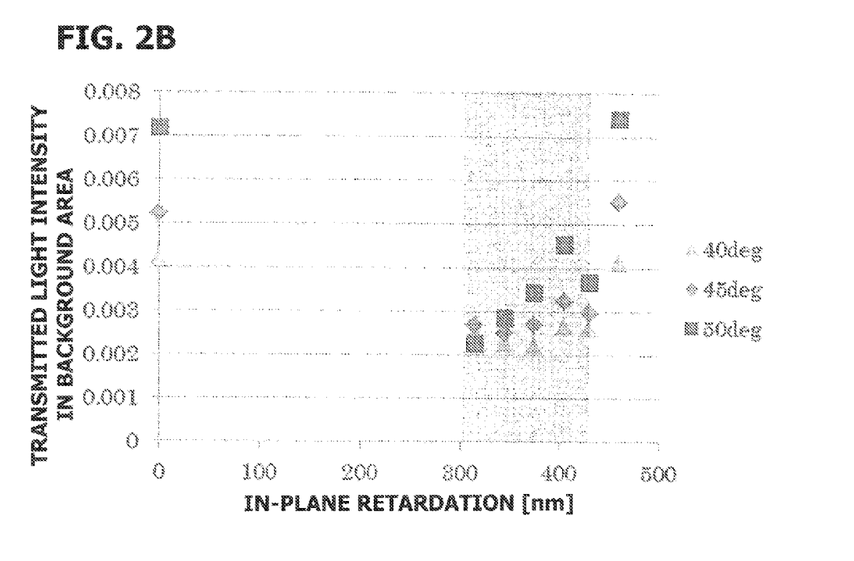

FIG. 2A and FIG. 2B are graphs showing an in-plane retardation dependency of a transmitted light intensity in a background area. Herein, the background area means a non-display portion, and a display portion in which voltage is not applied between the electrodes 11b and 12b. The horizontal axis in the two graphs indicates an in-plane retardation of the optical film 14 in a unit of "nm", and the vertical axis in the graphs indicates the transmitted light intensity in the background area when the light emitting intensity of the backlight unit 20 is assumed to be "1". FIG. 2A and FIG. 2B, respectively, indicate the transmitted light intensities in a case where viewing angles are 40°, 45° and 50° in the direction of three o'clock and the direction of nine o'clock.

In addition, FIG. 6A and FIG. 6B are graphs showing a transmitted light intensity in a liquid crystal display apparatus (a liquid crystal display apparatus of the related art) which corresponds to a configuration in which the optical film 14 is removed from the liquid crystal display apparatus having the configuration according to FIG. 1A and FIG. 1B. In the graphs in FIG. 2A to FIG. 4B, a plot of in-plane retardation 0 nm indicates a case where the optical film 14 is not disposed (the case of the liquid crystal display apparatus of the related art).

When compared with the plot of the in-plane retardation of 0 nm, the transmitted light intensity for each viewing angle in the range of the in-plane retardation from 300 nm to 430 nm of the optical film 14 is lower than that of the liquid crystal display apparatus of the related art having no optical film 14 disposed. In other words, in this range, it can be seen that it is possible for the embodiment to realize an excellent display having a lower transmittance of the background area than that of the related art.

Figure 3A:
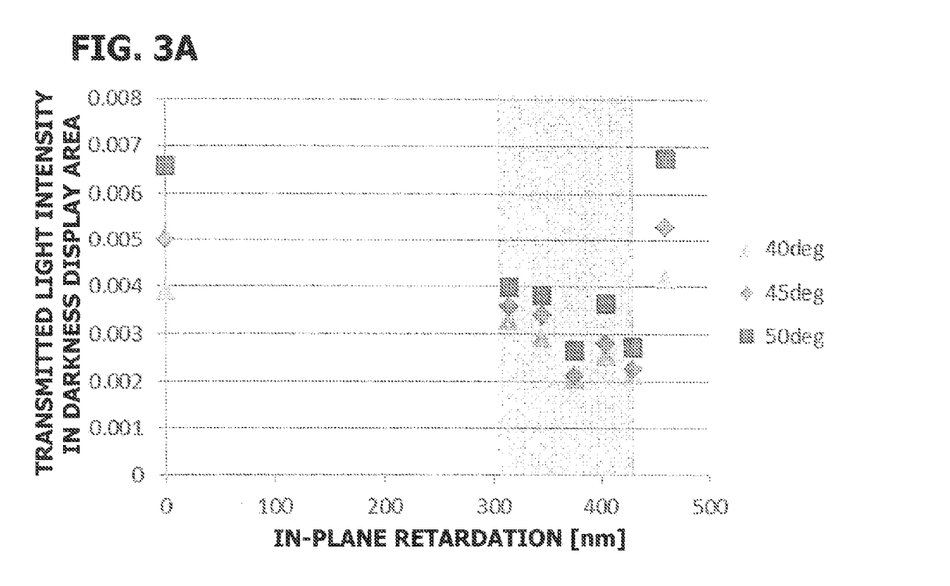
FIG. 3A and FIG. 3B are graphs showing an in-plane retardation dependency of a transmitted light intensity in a darkness display area.
Figure 3B:
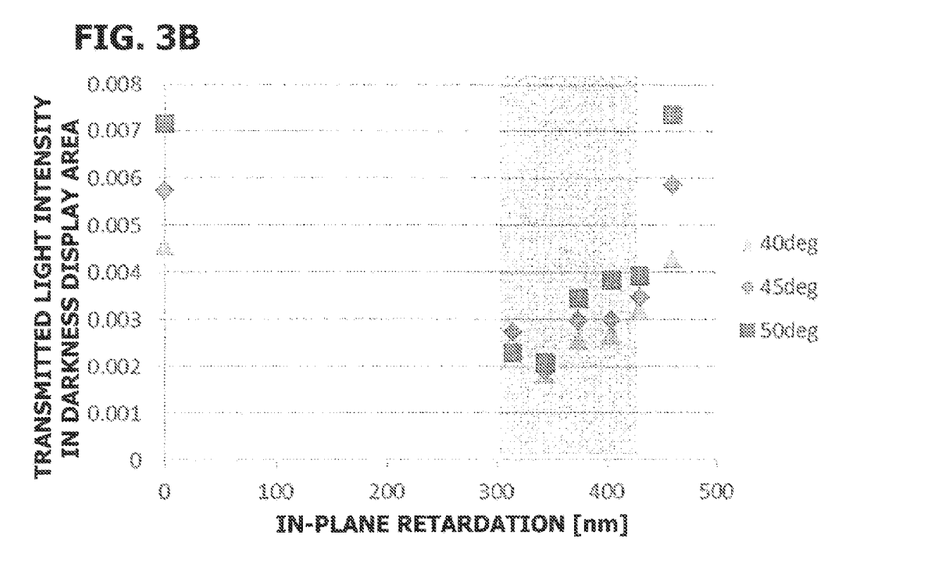

FIG. 3A and FIG. 3B are graphs showing an in-plane retardation dependency of a transmitted light intensity in a darkness display area. Herein, the darkness display area means a display portion in which a drive waveform is applied between the electrodes 11b and 12b to form a darkness display. The horizontal axis in the two graphs indicates an in-plane retardation of the optical film 14 in a unit of "nm", and the vertical axis in the graphs indicates the transmitted light intensity in the darkness display area when the light emitting intensity of the backlight unit 20 is assumed to be "1". FIG. 3A and FIG. 3B, respectively, indicate the transmitted light intensities in a case where viewing angles are 40°, 45° and 50° in the direction of three o'clock and the direction of nine o'clock.

When compared with the plot of the in-plane retardation of 0 nm, the transmitted light intensity for each viewing angle in the range of the in-plane retardation from 300 nm to 430 nm of the optical film 14 is lower than that of the liquid crystal display apparatus of the related art having no optical film 14 disposed. In other words, in this range, it can be seen that it is possible for the embodiment to realize an excellent display having a lower transmittance of the darkness display area than that of the related art.

Figure 4A:
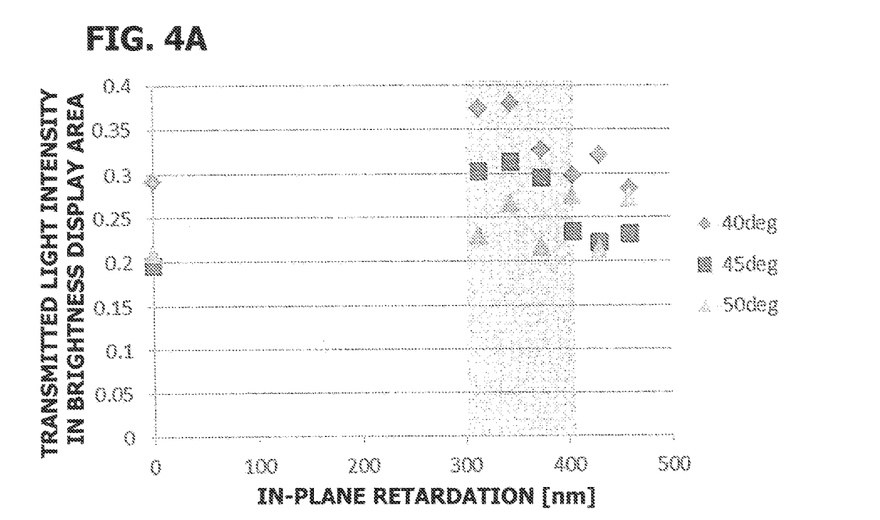
FIG. 4A and FIG. 4B are graphs showing an in-plane retardation dependency of a transmitted light intensity in a brightness display area.
Figure 4B:
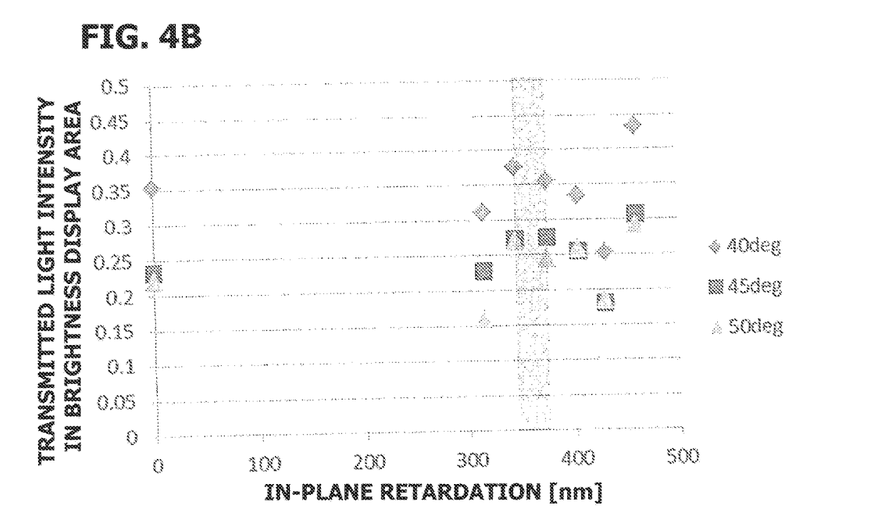

FIG. 4A and FIG. 4B are graphs showing an in-plane retardation dependency of a transmitted light intensity in a brightness display area. Herein, the brightness display area means a display portion in which a drive waveform is applied between the electrodes 11b and 12b to form a brightness display. The horizontal axis in the two graphs indicates an in-plane retardation of the optical film 14 in a unit of "nm", and the vertical axis in the graphs indicates the transmitted light intensity in the brightness display area when a transmitted light intensity of the liquid crystal display element 10 when seen in a plan view is assumed to be "1". FIG. 4A and FIG. 4B, respectively, indicate the transmitted light intensities in a case where viewing angles are 40°, 45° and 50° in the direction of three o'clock and the direction of nine o'clock.

When compared with the plot of the in-plane retardation of 0 nm, in the case of the direction of three o'clock (FIG. 4A), the transmitted light intensity for each viewing angle in the range of the in-plane retardation from 300 nm to 405 nm of the optical film 14 is greater than that of the liquid crystal display apparatus of the related art having no optical film 14 disposed. Further, in the case of the direction of nine o'clock (FIG. 4B), the transmitted light intensity for each viewing angle in the range of the in-plane retardation from 345 nm to 375 nm of the optical film 14 is greater than that of the liquid crystal display apparatus of the related art having no optical film 14 disposed. In other words, in these ranges, it can be seen that it is possible for the embodiment to realize an excellent display having a higher transmittance of the brightness display area than that of the related art.

There may be provided a configuration in which the in-plane retardation of the optical film 14 in the liquid crystal display apparatus having a configuration according to FIG. 1A and FIG. 1B is set to be from 300 nm to 430 nm. Such a configuration can cause realizing of an excellent display in which the transmittance of the background area and the transmittance of the darkness display area for the deeper viewing angle are low. Further, there may be provided a configuration in which the in-plane retardation is set to be from 300 nm to 405 nm, more preferably from 345 nm to 375 nm. Such a configuration can cause realizing of an excellent display in which the transmittance of the brightness display area for the deeper viewing angle is high (the liquid crystal display apparatus according to the embodiment). For example, particularly, in a case where the backlight for emitting the blue light is used, it is possible to obtain an excellent display state.

As stated above, some aspects of the present invention are described based on the embodiments, but the invention is not limited thereto.

For example, in the embodiments, the retardation Δnd of the liquid crystal layer 13 is set to be 2.76 μm. However, the invention may be applied to any liquid crystal display apparatus having Δnd exceeding 2 μm in view of the study results of the inventor of this application.

Further, in the embodiments, the liquid crystal display element 10 having no unevenness on the surface of the substrates 11 and 12 is used similar to the case of Japanese Unexamined Patent Application Publication No. 2001-147414. However, at least one of the substrates 11 and 12 may be provided with the unevenness on the substrate surface facing the liquid crystal layer 13.

Further, in the liquid crystal display apparatus according to the embodiments, a coloring matter may be mixed into the liquid crystal layer 13 so as to further decrease, for example, the transmittance of the background area and the transmittance of the darkness display area.

Further, in the embodiments, the drive device 30 is used to operate the liquid crystal display element 10 using the multiplex driving. However, the drive device 30 may operate the liquid crystal display element 10 using a static driving, which also causes the same effect as that of the embodiments to be obtained. Furthermore, in the embodiments, the liquid crystal display element 10 is operated using the multiplex driving with ¼ duty, but may be operated using a multiplexing driving with ¼ or less duty.

In addition, it is obvious to an ordinary skilled person in the art that it is possible to make various types of changes, modifications, improvements, combinations and the like in the embodiments.

Some aspects of the invention may be applied to instruments of carriers (a car, a bicycle, a plane, a ship, a train and the like), on-vehicle liquid crystal display apparatuses for performing an audio display or a heat control display, and the like. Further, the liquid crystal display apparatus of the invention may be used as a display apparatus for consumer equipment, or a liquid crystal display apparatus for industrial equipment.

What is claimed is:

1. A liquid crystal display apparatus comprising:
a first substrate which includes a first electrode;
a second substrate which is disposed opposite to and approximately parallel to the first substrate and includes a second electrode;
a twisted nematic liquid crystal layer which is disposed between the first substrate and the second substrate, and is formed of a liquid crystal material of which a dielectric anisotropy is positive, and in which liquid crystal molecules are approximately horizontally aligned on the first substrate and the second substrate, and an alignment state of the liquid crystal molecules is twisted by approximately 90° between the first substrate and the second substrate;
a first polarizer which is disposed on one side of the first substrate, opposite to the other side of the first substrate facing the liquid crystal layer;
a second polarizer which is disposed on one side of the second substrate, opposite to the other side of the second substrate facing the liquid crystal layer, and is disposed in the manner of an approximately parallel Nicol arrangement with respect to the first polarizer; and
an optical film which is disposed between the first substrate and the first polarizer, and has a positive uniaxial optical anisotropy;
wherein a display portion is defined on an overlapping position between the first electrode and the second electrode when seen in a normal direction of the first substrate and the second substrate, and the display portion includes at least a segment display portion,
wherein a retardation Δnd of the liquid crystal layer is greater than 2 μm,
wherein absorbing axes of the first polarizer and the second polarizer are in parallel to an alignment direction of the liquid crystal molecules on surfaces of the first substrate or the second substrate,
wherein a slow axis of the optical film is in parallel to or orthogonal to the absorbing axes of the first polarizer and the second polarizer,
wherein an in-plane retardation of the optical film is from 300 nm to 430 nm, and
wherein when seen from viewing angles of 40° to 50° of two directions which are orthogonal to an alignment direction of the liquid crystal molecules located at the center in the thickness direction of the liquid crystal layer, a transmitted light intensity in a non-display portion and a display portion in which voltage is not applied between the first electrode and the second electrode is lower than a transmitted light intensity of a case where the optical film is not disposed.

2. The liquid crystal display apparatus according to claim 1,
wherein when seen from viewing angles of 40° to 50° of the two directions which are orthogonal to the alignment direction of the liquid crystal molecules located at the center in the thickness direction of the liquid crystal layer, a transmitted light intensity in a display portion in which a drive waveform is applied between the first electrode and the second electrode to form a darkness display is lower than a transmitted light intensity of a case where the optical film is not disposed.

3. The liquid crystal display apparatus according to claim 1,
wherein an in-plane retardation of the optical film is from 300 nm to 405 nm, and
wherein when seen from viewing angles of 40° to 50° of one direction which is orthogonal to the alignment direction of the liquid crystal molecules located at the center in the thickness direction of the liquid crystal layer, a transmitted light intensity in a display portion in which a drive waveform is applied between the first electrode and the second electrode to form a brightness display is higher than a transmitted light intensity of a case where the optical film is not disposed.

4. The liquid crystal display apparatus according to claim 3,
wherein an in-plane retardation of the optical film is from 345 nm to 375 nm, and
wherein when seen from viewing angles of 40° to 50° of two directions which are orthogonal to the alignment direction of the liquid crystal molecules located at the center in the thickness direction of the liquid crystal layer, a transmitted light intensity in a display portion in which a drive waveform is applied between the first electrode and the second electrode to form a brightness display is higher than a transmitted light intensity of a case where the optical film is not disposed.

5. The liquid crystal display apparatus according to claim 1, further comprising:
a drive device which is electrically connected to the first electrode and the second electrode and applies a multiplex drive waveform having ¼ or less duty or a static drive waveform between the first electrode and the second electrode; and
a light source which is disposed on one side of the first polarizer or the second polarizer opposite to the other side of the first polarizer or the second polarizer facing the liquid crystal layer, and emits blue light.

6. The liquid crystal display apparatus according to claim 5,
wherein the light source includes a light emitting source which emits light having a center wavelength of 490 nm.

7. The liquid crystal display apparatus according to claim 5,
wherein the light source includes a light emitting source which emits white light, and a blue color filter of a center wavelength of 490 nm.

8. The liquid crystal display apparatus according to claim 1,
wherein at least one of the first substrate and the second substrate is provided with an unevenness on a surface of the substrates facing the liquid crystal layer.

* * * * *